United States Patent
Alexander et al.

(10) Patent No.: US 10,853,577 B2
(45) Date of Patent: Dec. 1, 2020

(54) RESPONSE RECOMMENDATION SYSTEM

(71) Applicant: salesforce.com, inc., San Francisco, CA (US)

(72) Inventors: Zachary Alexander, Berkeley, CA (US); Jayesh Govindarajan, Palo Alto, CA (US); Peter White, San Francisco, CA (US); Weiping Peng, San Francisco, CA (US); Colleen Smith, Mill Valley, CA (US); Vishal Shah, Redmond, CA (US); Jacob Nathaniel Huffman, Oakland, CA (US); Alejandro Gabriel Perez Rodriguez, Redmond, WA (US); Edgar Gerardo Velasco, San Francisco, CA (US); Na Cheng, Dublin, CA (US)

(73) Assignee: salesforce.com, inc., San Francisco, CA (US)

( * ) Notice: Subject to any disclaimer, the term of this patent is extended or adjusted under 35 U.S.C. 154(b) by 111 days.

(21) Appl. No.: 16/138,662

(22) Filed: Sep. 21, 2018

(65) Prior Publication Data

US 2020/0097544 A1   Mar. 26, 2020

(51) Int. Cl.
| | |
|---|---|
| *G06F 40/30* | (2020.01) |
| *G06N 3/04* | (2006.01) |
| *G06N 3/08* | (2006.01) |
| *G06F 40/35* | (2020.01) |
| *G06F 3/0484* | (2013.01) |

(52) U.S. Cl.
CPC .............. *G06F 40/30* (2020.01); *G06F 40/35* (2020.01); *G06N 3/0454* (2013.01); *G06N 3/08* (2013.01); *G06F 3/0484* (2013.01)

(58) Field of Classification Search
CPC .......... G06F 40/30; G06F 40/35; G10L 15/22
See application file for complete search history.

(56) References Cited

U.S. PATENT DOCUMENTS

| | | | |
|---|---|---|---|
| 6,401,061 B1 * | 6/2002 | Zieman | G06F 40/30 704/10 |
| 7,487,095 B2 * | 2/2009 | Hill | G10L 15/1822 704/275 |
| 9,037,464 B1 * | 5/2015 | Mikolov | G06F 40/30 704/255 |
| 9,141,916 B1 * | 9/2015 | Corrado | G06N 3/0454 |
| 9,852,177 B1 * | 12/2017 | Cheung | G06N 3/08 |
| 2017/0372694 A1 * | 12/2017 | Ushio | G10L 15/16 |
| 2018/0082032 A1 * | 3/2018 | Allen | G06F 19/325 |
| 2018/0082184 A1 * | 3/2018 | Guo | G10L 15/22 |
| 2018/0089588 A1 * | 3/2018 | Ravi | G06N 20/00 |
| 2018/0113939 A1 * | 4/2018 | Chen | G06F 16/951 |
| 2020/0090651 A1 * | 3/2020 | Tran | G06N 3/0481 |

* cited by examiner

*Primary Examiner* — Shaun Roberts
(74) *Attorney, Agent, or Firm* — Holland & Hart LLP

(57) ABSTRACT

A data processing system analyzes a corpus of conversation data received at an interactive conversation service to train a response recommendation model. The response recommendation model generates response vectors based on custom responses and using the trained model and generates a context vector based on received input at the interactive conversation service. The context vector is compared to the set of response vectors to identify a set of recommended responses, which are recommended to an agent conversing with a user using the interactive conversation service.

20 Claims, 13 Drawing Sheets

RESPONSE RECOMMENDATION SYSTEM

FIELD OF TECHNOLOGY

The present disclosure relates generally to database systems and data processing, and more specifically to response recommendation system.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support a chat system that allows a customer support agent to live-chat with a customer. The chat may be utilized to help a customer regarding purchases, returns, order status, etc. An agent, which uses the chat system to converse with the customer, may periodically reply with the same or similar responses to customer inputs, which may be time consuming, and thus expensive, for the agent or the agent's organization.

DETAILED DESCRIPTION

Figure 1:
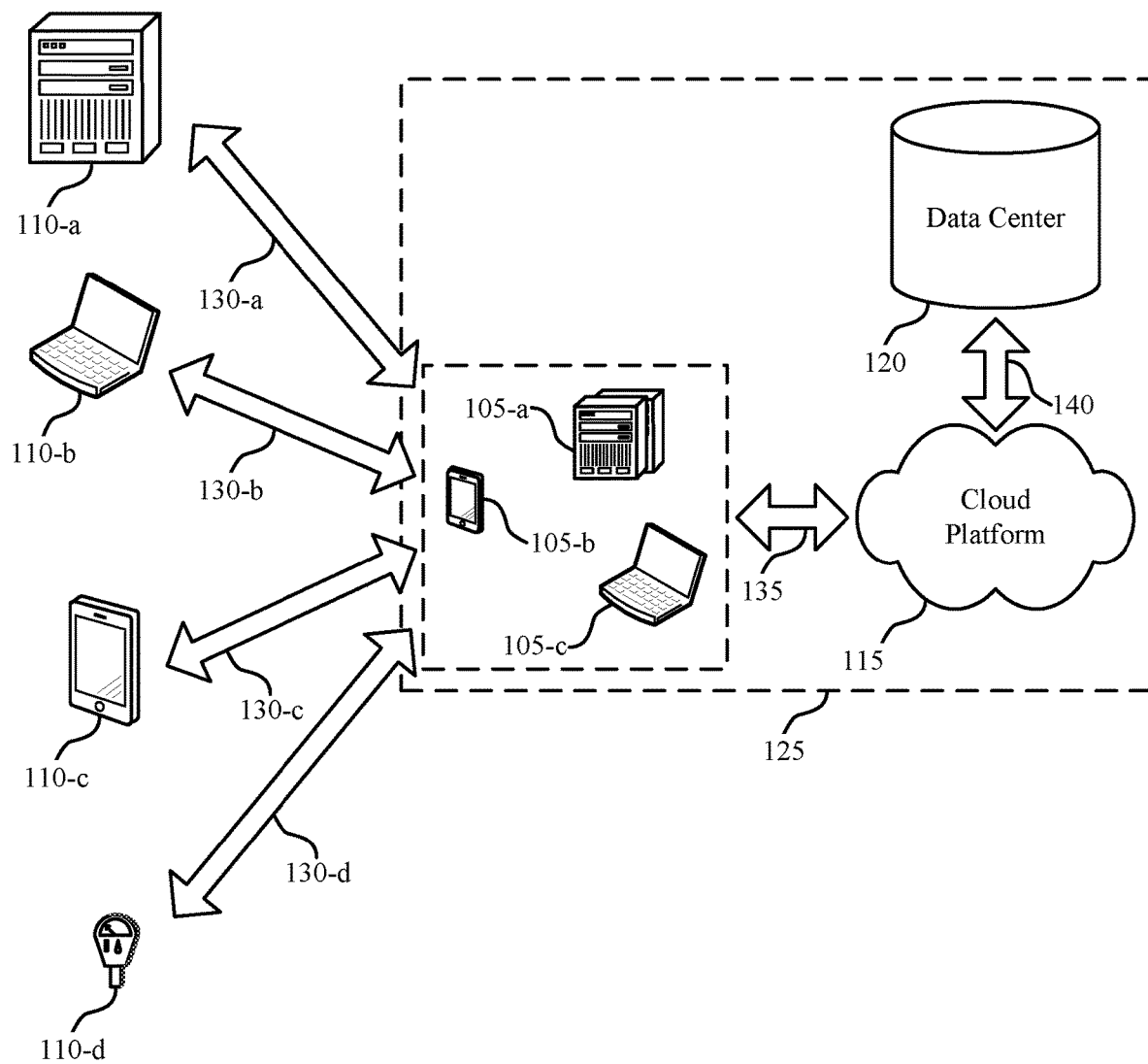
FIG. 1 illustrates an example of a system for suggesting a response at an interactive conversation service that supports a response recommendation system in accordance with aspects of the present disclosure.

A response recommendation system described herein is trained on a corpus of unlabeled conversation data based on previous conversation sessions between users and agents. The system utilizes word embedding functions that are trained on historical conversation data and that are used to generate vectors corresponding to live-conversation context and suggested responses. The system allows for suggested responses to be customized on the fly by an agent during a chat or by an organization. The model is dynamically updated based on the custom responses, and the custom responses may be recommended responses to subsequent inputs by users of an interactive conversation service.

The response recommendation system includes a training component that generates training data based on a corpus of unlabeled conversation data and trains a model for response recommendation using the training data. The training data is generated by creating a set of context-response pairs and labels corresponding to each pair. The context-response pairs include a context, which includes the "context" of a conversation session at an interactive conversation service. The context of a conversation may include a sequence of inputs at an interactive conversation service during a conversation session. For example, k inputs (by both an agent and a user) provides a context for a conversation. The context-response pairs further include a response input by an agent during a conversation session. In some pairs of the set of context-response pairs, the response is a first response (e.g., the first response) following the k inputs corresponding to the context. Because the context and the response are pulled from the same conversation session, a label corresponding to the context-response pair is set with a first value (e.g., "1," which indicates that the pair is true). In some pairs of the set of context-response pairs, the response is a random response selected from the corpus of conversation data. Because the context and response generally do not correspond to the same conversation session, the corresponding label is set with a second value (e.g., "0," which indicates that the pair is false). Each context of a context-response pair is input into a context-word embedding function to generate a context vector, and each response of a context-response pair is input into a response word embedding function to generate a response vector. The context vector and response vector are compared to determine similarity, and the similarity and corresponding label are input into a loss-function to monitor the accuracy of the model as it its trained.

During use of the trained model (e.g., during a live conversation session), an input by a user may trigger the response recommendation process. The input and previous inputs (e.g., by the user and the agent) are used to generate a context vector using the trained context word embedding function. The context vector is compared to a set of response vectors corresponding to potentially recommended responses. The response vectors may be based on custom responses generated by the agent, a team, or the organization that are input into the response word embedding function. The top responses corresponding to the response vectors that are most similar to the context vector are selected for recommendation to the agent. The recommended responses may be displayed at a device (e.g., via a widget) of the agent.

Because the model is trained on unlabeled data, the model is trained in an unsupervised manner. Further, generation and use of the training data provides a highly informative model. For example, because the model is trained on historical chat data corresponding to an entity such as an organization, the chat data is highly structured in that the chat data may include highly similar chat context and responses. For example, chat data corresponding to an online retailer may have many conversations corresponding to order status, returns, etc. Thus, the chat data generates a highly informative model. Furthermore, the data does not need to be labeled or classified by a user or administrator. The chat data may be processed, and the model may be generated without any or very little user interaction.

Aspects of the disclosure are initially described in the context of an environment supporting an on-demand database service. Aspects of the disclosure are further described with respect to a general system diagram, a training system, a real-time use system, and a process-flow diagram. Aspects of the disclosure are further illustrated by and described with reference to apparatus diagrams, system diagrams, and flowcharts that relate to response recommendation system.

FIG. 1 illustrates an example of a system 100 for cloud computing that supports a response recommendation system in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Cloud platform 115 may offer an on-demand chat service to the cloud client 105. The cloud client 105 may utilize the chat service for customer support for the contacts 110, for example. In some example implementations, a contact 110 may access the chat service via a browser or an application at a device of the cloud client 110. For example, a cloud client 105 is an internet retailer, and customers of the internet retailer interact with agents of the internet retailer via the chat service. The customers may utilize the chat service to resolve issues or receive information regarding orders, returns, product issues, etc. Because agents may interact with many different customers via the chat service, the agents may enter similar responses to many different, but similar, inquiries. Implementations described herein provide a system that provides suggested responses to an agent responsive to a customer input. The implementations are described with respect to a text chat system, but it should be understood that the implementations are applicable to many types of interactive conversation service, such as, chat bots, intelligent assistants, email systems, voice chat systems, etc.

In some response recommendations systems, the recommended responses may be based on a static set of responses, and inputs by a user may be associated with categorized responses. For example, an input by a user that mentions "return," is responded to with a recommended response such as "are you seeking information on a return?" Such systems are functionally limited in that the systems do not account for many different types and methods of inquiry, the systems consider only the most previous input by the user, and the systems require potential inputs to be labeled (e.g., categorized). For example, some systems may require that many example inputs be labeled for each potentially suggested response. A classifier may have been trained on the set of labeled inputs. In other words, previous systems utilized supervised learning to train a model. Furthermore, in some systems, the list of suggested responses is static, and any response addition to the suggested response system required retraining of the model.

Aspects of the disclosure described herein provide a suggested response system that is trained, in an unsupervised manner, on unlabeled historical conversation data. The historical conversation data includes a chat history (e.g., context) and responses for many different conversations. A corpus of historical chat data may correspond to a particular cloud client, and thus the chat data is highly structured. Training data is generated using the historical chat data, and the training data is used to train a response recommendation model. The model includes a context embedding component, a response embedding component, a vector comparison component, and a loss calculation component. The context embedding component takes data corresponding to context of a conversation and generates a context vector. The context of a conversation may include a sequence of inputs at an interactive conversation service during a conversation session. For example, k inputs (by both an agent and a user) may provide a context for a conversation. The context vector for a conversation is generated by a word embedding function using the k inputs. The response embedding component generates a response vector using a word embedding function and based on a response (by an agent) during a conversation session. A context and a response from the same conversation session have similar generated vectors, and a context and a response from different conversation session do not have similar generated vectors. Accordingly, when training data is generated, context-response pairs generated from the same conversation sessions are labeled with a first value (e.g., "1", which indicates that the pair is true), and context-response pairs generated from different conversation sessions are labeled with a second value (e.g., "0," which indicates that the pair is false). Vectors from the context-response pairs are evaluated for similarity and the loss is calculated (e.g., by the loss calculation component) using the labels. Accordingly, because the word embedding functions are trained using structured and labeled data, a highly informative vector space for contexts and responses is generated and the functions are trained to generate informative vectors.

During use of the trained model (e.g., during a live conversation session at an interactive conversation service), an input by the user may trigger the suggested response process. The input and previous k inputs (e.g., by the user and the agent) are used to generate a context vector using the trained context word embedding function. The context vector is compared to a set of response vectors corresponding to responses. The set of response vectors may be generated using custom responses input into the model by the agent, a team, the organization, etc. For example, after the model is trained on the corpus of historical conversation data, the agent or the organization inputs a set of unlabeled suggested responses into the model, which generates a set of response vectors. The live context vector is compared to the set of response vectors to determine similarity scores. The top responses corresponding to the top n similar response vectors may be selected for recommended responses. The selected responses may be displayed (e.g., in widget) at the device of the agent during the conversation session, and the agent may select one of the suggested responses for input to the user responsive to the user's input. In some scenarios, the agent may input a custom response during a conversation session. The custom response may be input into the model and used to suggest subsequent responses.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example use of the system 100, a cloud client 105 elects to utilize the response recommendation system. A corpus of historical chat data of the cloud client 105 is analyzed to train the response recommendation model. As will be described in more detail below, model training requires very little or no input on the part of any administrator. Once the model is trained, the cloud client 105 may input a number of custom responses, which are used to generate response vectors. During use of the system by an agent and a user (e.g., a customer), conversation context (e.g., a sequence of inputs) are input into the system to generate context vectors, which are compared to the response vectors. The similar response vectors are selected for recommendation to the agent. In some example implementations, a response is automatically input into the conversation session without selection by the agent.

Figure 2:
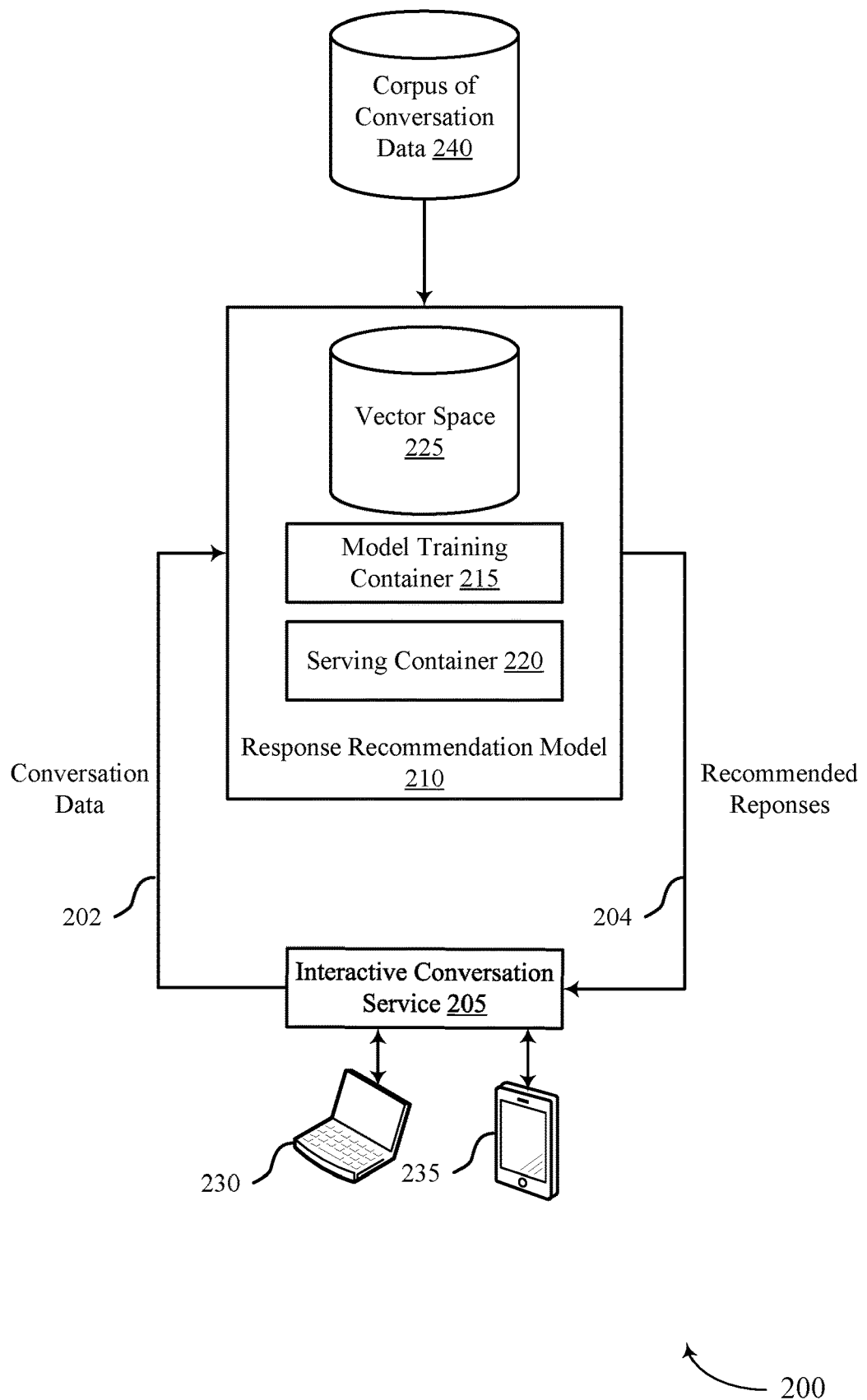
FIG. 2 illustrates an example of a system that supports response recommendation in accordance with aspects of the present disclosure.

FIG. 2 illustrates an example of a system 200 that supports response recommendation in accordance with aspects of the present disclosure. The system 200 includes a response recommendation model 210 and an interactive conversation service 205. The response recommendation model 210, which may be an example of a response recommendation module 615 of FIG. 6, includes a model training container 215, a serving container 220, and a data store corresponding to a vector space 225. The model training container 215, which may be an example of a model training container 310 of FIG. 3, includes components for training a context word embedding function and a response word embedding function based on a corpus of conversation data 240. In the processing of training the word embedding functions, a plurality of context and response vectors are generated, which correspond to the vector space 225. The vector space includes contexts (e.g., sequences of inputs corresponding to a conversation session) mapped to vectors of real numbers and responses (e.g., an input by an agent) mapped to vectors of real numbers.

The response recommendation model 210 is linked to the interactive conversation service 205 via communication links 202 and 204. The serving container 220, which may be an example of a serving container 410 described with respect to FIG. 4, receives live communication data between an agent (represented by a device 230) and a user (represented by device 235) via the communication link 202, converts the communication data into a context vector, and compares the context vector to a set of response vectors to determine recommended responses. The set of response vectors may be custom responses generated by the agent 230, the entity, or a team, for example. The responses recommended by the response recommendation model 210 are transmitted to the interactive conversation service 205 via communication link 204, and the recommended responses may be displayed for selection by the agent 230 in reply to an input by the user 235.

Figure 3:
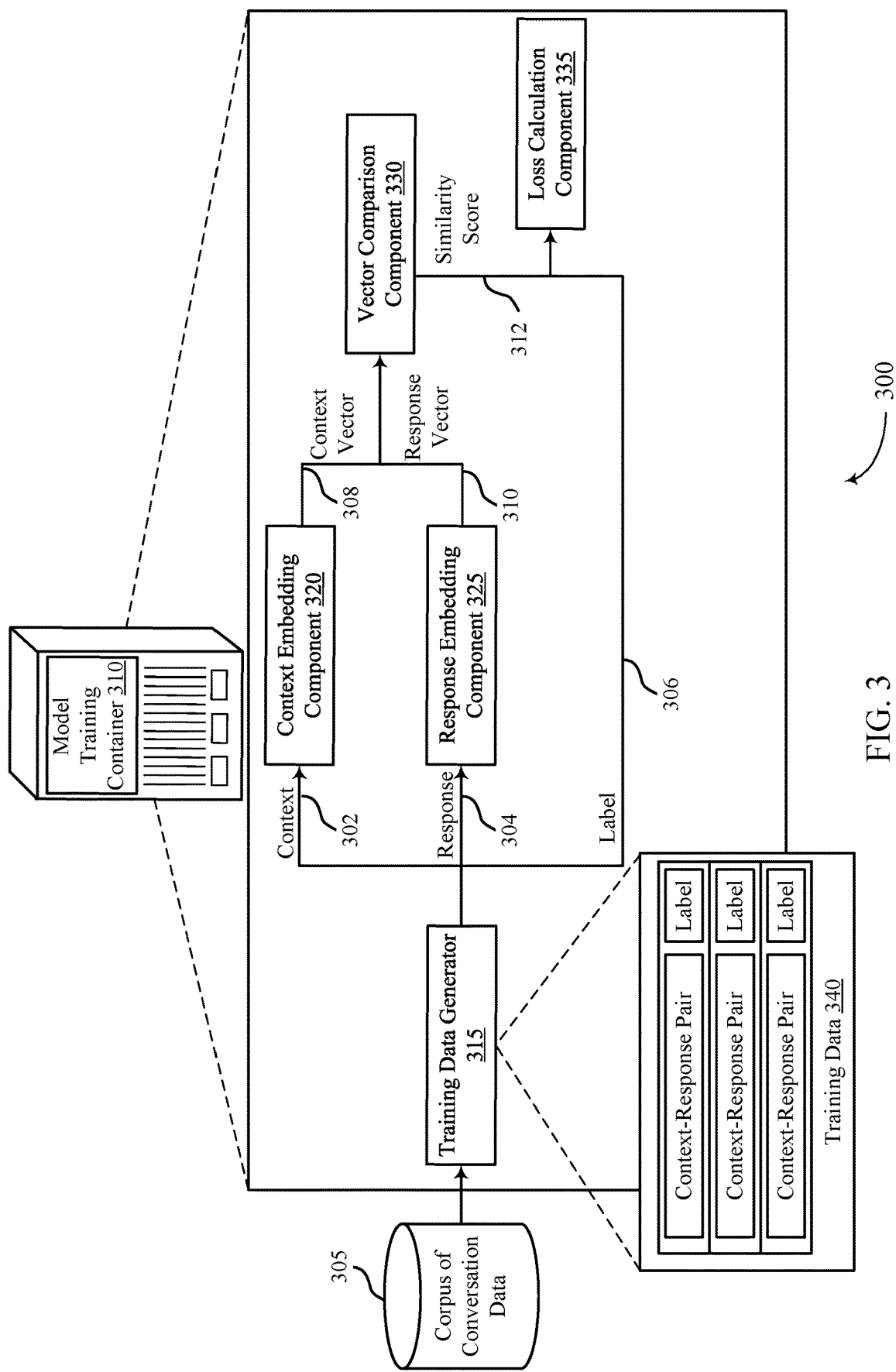
FIG. 3 illustrates an example of a model training system that supports response recommendation in accordance with aspects of the present disclosure.

FIG. 3 illustrates an example of a model training system 300 that supports a response recommendation system in accordance with aspects of the present disclosure. The system 300 includes a model training container 310, which uses a corpus of conversation data 305 to generate a response recommendation model. The model training container 310 generates training data 340 based on the corpus of conversation data 305. The training data 340 includes a set of context-response pairs and labels corresponding to each context-response pair. To generate the context-response pairs, the training data generator 315 may select a context corresponding to a conversation session. In some example implementations, a conversation session corresponds to interaction between a user and an agent before the conversation is closed by the user or the agent. The context includes a sequence of inputs by both the user and the agent. In some example implementations, the sequence of inputs is a pre-determined number of inputs or includes substantially all inputs (e.g., before a response) of a conversation session. In some cases, the response includes the next input (e.g., following the selected sequence) by an agent during the conversation session (corresponding to a particular context), or the response includes a randomly selected input by an agent in the corpus of conversation data 305. When the response corresponds to a context in the same conversation session, the label corresponding to the context-response pair is given a first value (e.g., "1," which indicates that the pair is true or corresponds to the same conversation session). When the response is randomly selected for a context-response pair, the corresponding label is given a second value (e.g., "0," which indicates that the pair is false or does not correspond to the same conversation session).

A plurality of context-response pairs and labels may be generated for the training data 340. Some of the context-response pairs include true pairs that are selected from the same conversation session, and some of the context-response pairs are false pairs that are not selected from the same conversation session. The number of true pairs of the set may be configured by an administrator before the data is trained. Further, the number of inputs used for context may be configured by the administrator. The administrator may further configure the probability of choosing, by the training data generator 315, a positive example from later in a conversation session. This probability increases topic acuity by the model. The administrator may configure the probability of choosing a negative example from later in the same conversation session, which promotes temporal acuity.

Each context 302 of a context-response pair is input into a context embedding component 320, and each response 304 is input into a response embedding component 325. The context 302 and the response 304 may be pre-processed before being input into the respective components. Such pre-processing may be performed by the training data generator 315 and may include tokenizing the inputs. The context embedding component 320 and the response embedding component 325 may be examples of components enabling neural networks that map inputs to fixed-length vectors. The context embedding components 320 and response embedding components 325 may include or share processors and/or memory for processing data and generating vectors.

The context embedding component 320 generates a context vector 308 based on the input context 302, and the response embedding component 325 generates a response vector 310 based on the input response 304. For each context-response pair, a vector comparison component 330, compares the context vector 308 and the response vector 310 and outputs a similarity score 312. Calculation of similarities between vectors as described herein may be based on a variety of techniques including without limitation, cosine similarity, Manhattan distance, Euclidean distance, etc. The similarity score 312 and the label 306 corresponding to the context-response pair are input to a loss calculation component 335. The loss calculation component 335 implements a loss-function that optimizes the model as determined errors are back-propagated through the model as the model is trained.

Figure 4:
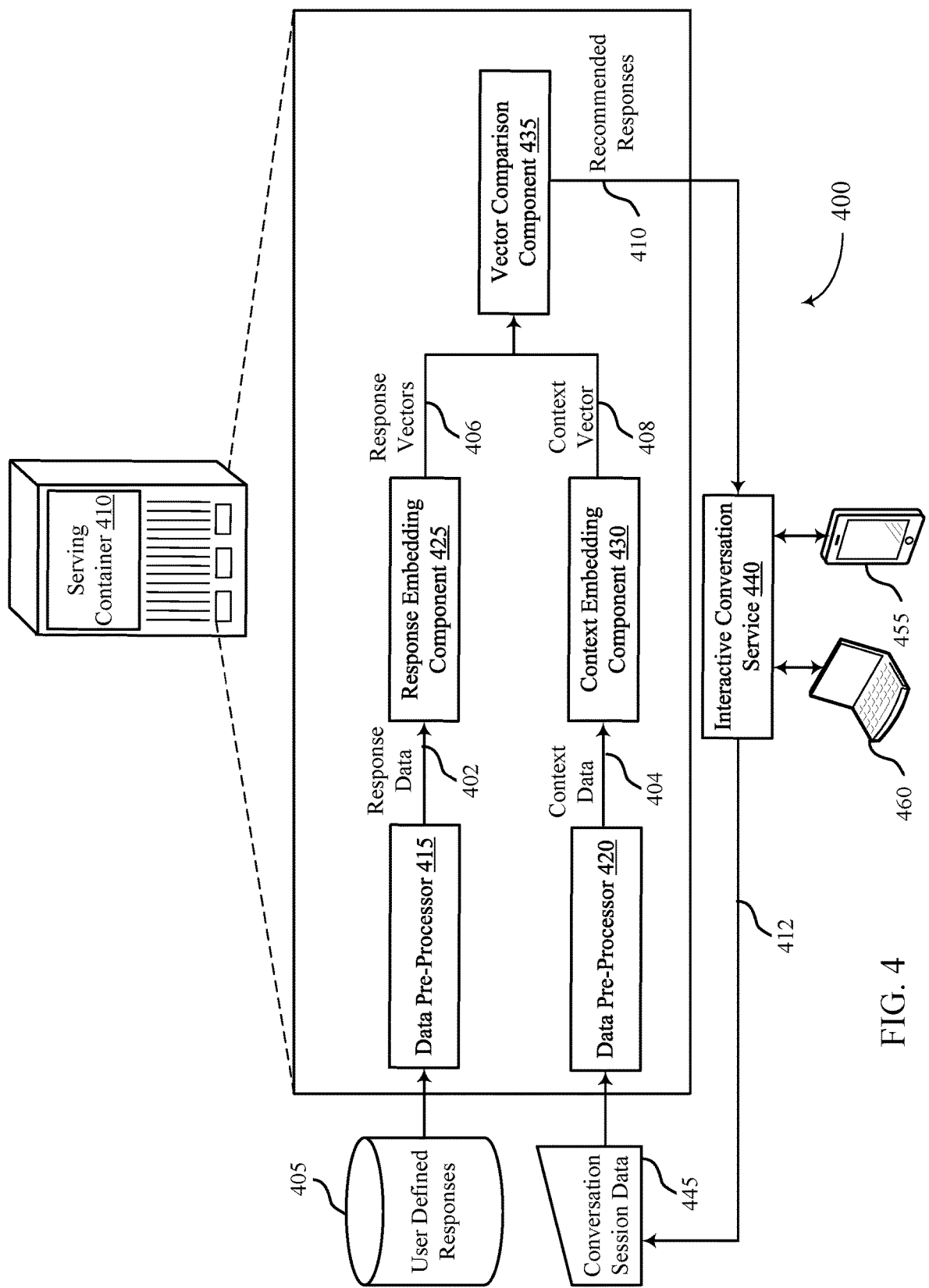
FIG. 4 illustrates an example of a serving system that supports response recommendation in accordance with aspects of the present disclosure.

FIG. 4 illustrates an example of a serving system 400 that supports a response recommendation system in accordance with aspects of the present disclosure. The system 400 includes a serving container 410. The serving container includes a response embedding component 425 and a context embedding component 430. The response embedding component 425 may be an example of the trained response embedding component 325 of FIG. 3, and the context embedding component 430 may be an example of the trained context embedding component 320 of FIG. 3. A set of user defined responses 405 may be input into the serving container 410. The set of user defined responses 405 may be selected by an agent, a group, or an organization using the response recommendation system. In some cases, a response of the set of user defined responses 405 is input by an agent during a live conversation session with a user. A data pre-processor 415 pre-processes the responses for input into the response embedding component 425. Such pre-processing 415 may include parsing and tokenizing the input. The data pre-processor 415 outputs response data 402 which is processed by the response embedding component 425. The response embedding component 425 outputs a set of response vectors 406. Because the response embedding component 425 is trained on a rich set of conversation data, the response vectors 406 are informative representations of the responses.

Live conversation session data 445 is input into the serving container 410 via a communication link 412 between an interactive conversation service 440 and the serving container 410. For example, when a user (e.g., a user represented by a device 455) inputs an utterance (e.g., text) into the interactive conversation service 440 when conversing with an agent (e.g., an agent represented by the device 460), the input including the context is input into the serving container 410. The context may include input by the user 455 and the prior k inputs by the user and the agent, which forms a sequence of inputs. The sequence of inputs is processed by a data pre-processor 420, which may be an example of the data pre-processor 415. The data pre-processor 420 outputs context data 404, which is input into the context embedding component 430. The context embedding component outputs a context vector 408. A vector comparison component 435, which may be an example of a vector comparison component 330 of FIG. 3, may compare the context vector 408 to the set of response vectors 406 to calculate similarity scores between the vectors. The vector comparison component 435 outputs a set of recommended responses corresponding to the highest similarity scores between vectors over a communication link 410 to the interactive conversations service 440. Accordingly, the serving container 410 determines recommendation responses based on a score that is determined by score(context, response)=H(F(context), G(response)), where F is a neural network that maps any context to a fixed length vector (e.g., the context embedding component 430), G is a neural network that maps any response to a fixed-length vector (e.g., the response word embedding component 425), and H is a "simple" function for measuring the similarity between two vectors (e.g., cosign similarity). As noted, G(response) may be precomputed for a list of custom response (e.g., hundreds or thousands), F(context) may be computed in real-time (e.g., via TensorFlow serving), and the vector comparisons H(x, y) may be performed in real-time. In some cases, G is a term-frequency, inverse document frequency (TFIDF) vectorizer, a sum of word vectors, a long short-term memory (LSTM), cellular neural network (CNN), Self-attentive encoder, etc. In some cases, F is an average of utterance encodings, a concatenation, or an LSTM encoding. The interactive conversation service 440 may display the recommended responses (e.g., in a widget) for selection by the agent 460. In some cases, the top responses are input automatically without interaction by the agent 460.

During a live conversation, an agent may enter a custom response to an inquiry by the user 455. The agent may select the custom response for input into the response recommendation system. For example, the agent right clicks the custom response and selects save for subsequent recommendations. The custom response is input in the system as one of the user defined response 405, and a response vector 406 is generated based on the custom response. Accordingly, the model is dynamically updated without significant processing or retraining of the model.

The implementations described herein may be used in a conversations service that utilizes speech. For example, an intelligent personal assistant may convert audio input by a user into text, which is input into the response recommendation system. The response recommendation system selects a response based on the implementations described herein and converts the response to speech, which is output by the personal assistant.

Figure 5:
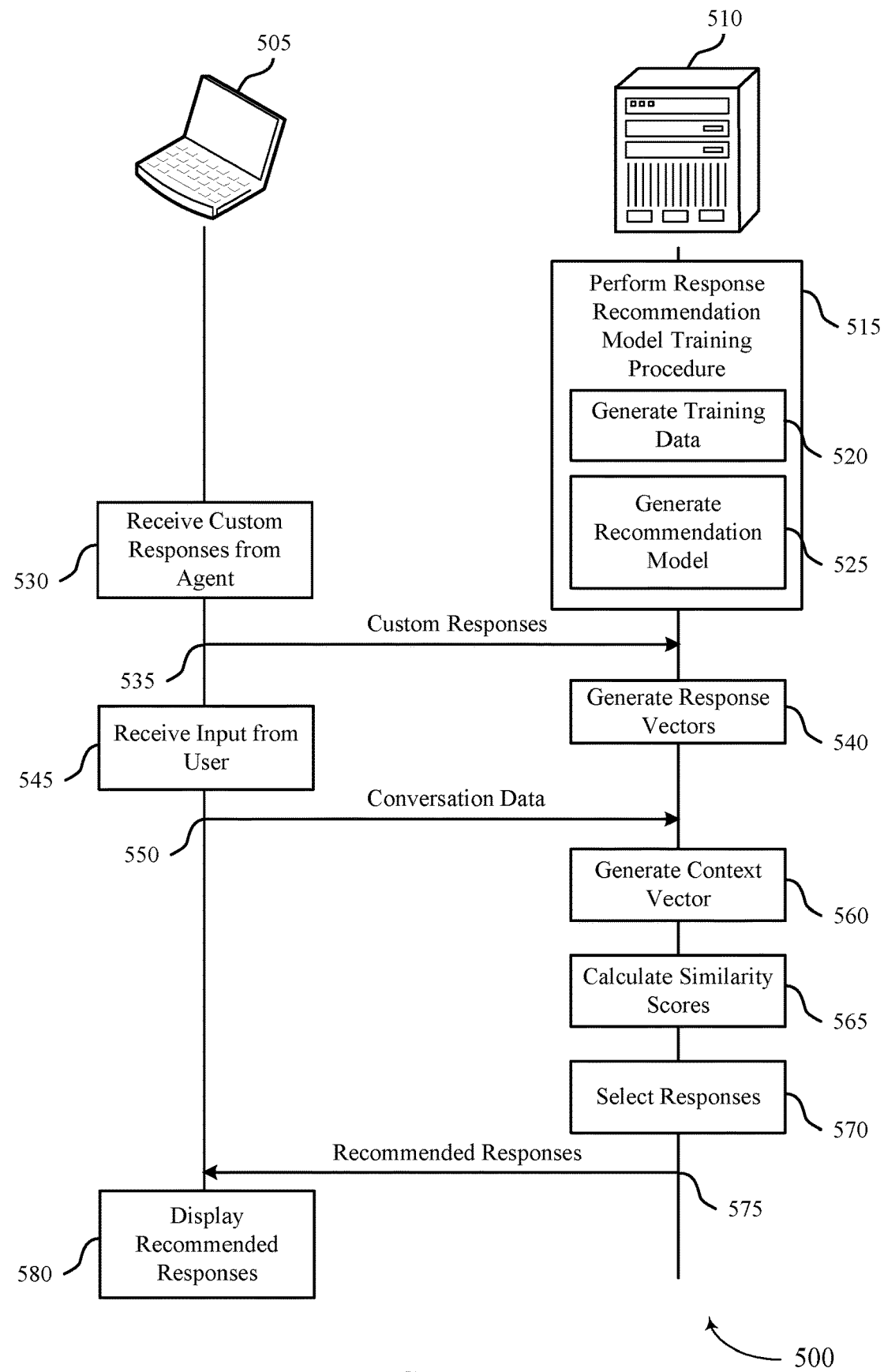
FIG. 5 illustrates an example of a data flow diagram that supports a response recommendation system in accordance with aspects of the present disclosure.

FIG. 5 illustrates an example of a data flow diagram 500 that supports a response recommendation system in accordance with aspects of the present disclosure. The data flow diagram 500 includes a device 505, which may be an example of a cloud client 105 of FIG. 1, and a data processing system 510, which may be an example of the response recommendation model 210 of FIG. 2. At 515, the data processing system 510 performs an intent classification model training procedure. The training procedure may be performed on a corpus of conversation data from the cloud client (e.g., the device 505). The training procedure includes generation of training data at 520. Generation of the training data includes generating a set of context-response pairs and labels corresponding to the context-response pairs. For a conversation session of the corpus of conversation data, the data processing system 510 selects a first set of sequential inputs (by an agent and user) for a context and a subsequent input by the agent as a response. The data processing system 510 assigns a first value (e.g., 1) to the context-response pair. For a second conversation session of the corpus of conversation data, the data processing system 510 selects a second set of sequential inputs (by an agent and user) for a context and a random response from the corpus as the response. the data processing system 510 assigns a second value (e.g., 0) to the context-response pair. The data processing system may generate a plurality of context-response pairs using the process described herein.

At 525, the data processing system 510 generates the recommendation model. Generation of the recommendation model includes generating a context vector for each context of each context-response pair of the set of context-response pairs using a context word embedding function. Generation of the recommendation model further includes generating a response vector for each response of each context-response pair of the set of context-response pairs using a response word embedding function. Similarity scores for each context vector and response vector of the set of context-response pairs are calculated, and a loss is determined using the similarity scores and the corresponding label.

At 530, the device 505 receives custom responses from an agent (or an organization). It should be understood that operation 530 may occur during a live chat using an interactive conversation service. At 535, the custom responses are transmitted to the data processing system 510. at 540, the data processing system 540 generates response vectors based on the custom responses and using the trained response embedding function.

At 545, the device 505 receives input from a user. The input is received during a live conversation session with an agent. At 550 conversation data including the input is transmitted to the data processing system 510. The conversation data may include all the inputs of the conversation session or a previous number of inputs.

At 560, the data processing system generates a context vector based on the conversation input and using the trained conversation word embedding function. At 560, the data processing system calculates similarity scores 565 between the context vector and the set of response vectors. At 570 the data processing system selects the top responses (by similarity score between the set of response vectors and the context vector) for recommendation to the agent. At 575, the selected responses are transmitted to the device 505. At 580, the recommended responses are displayed for selection by the agent.

Figure 6:
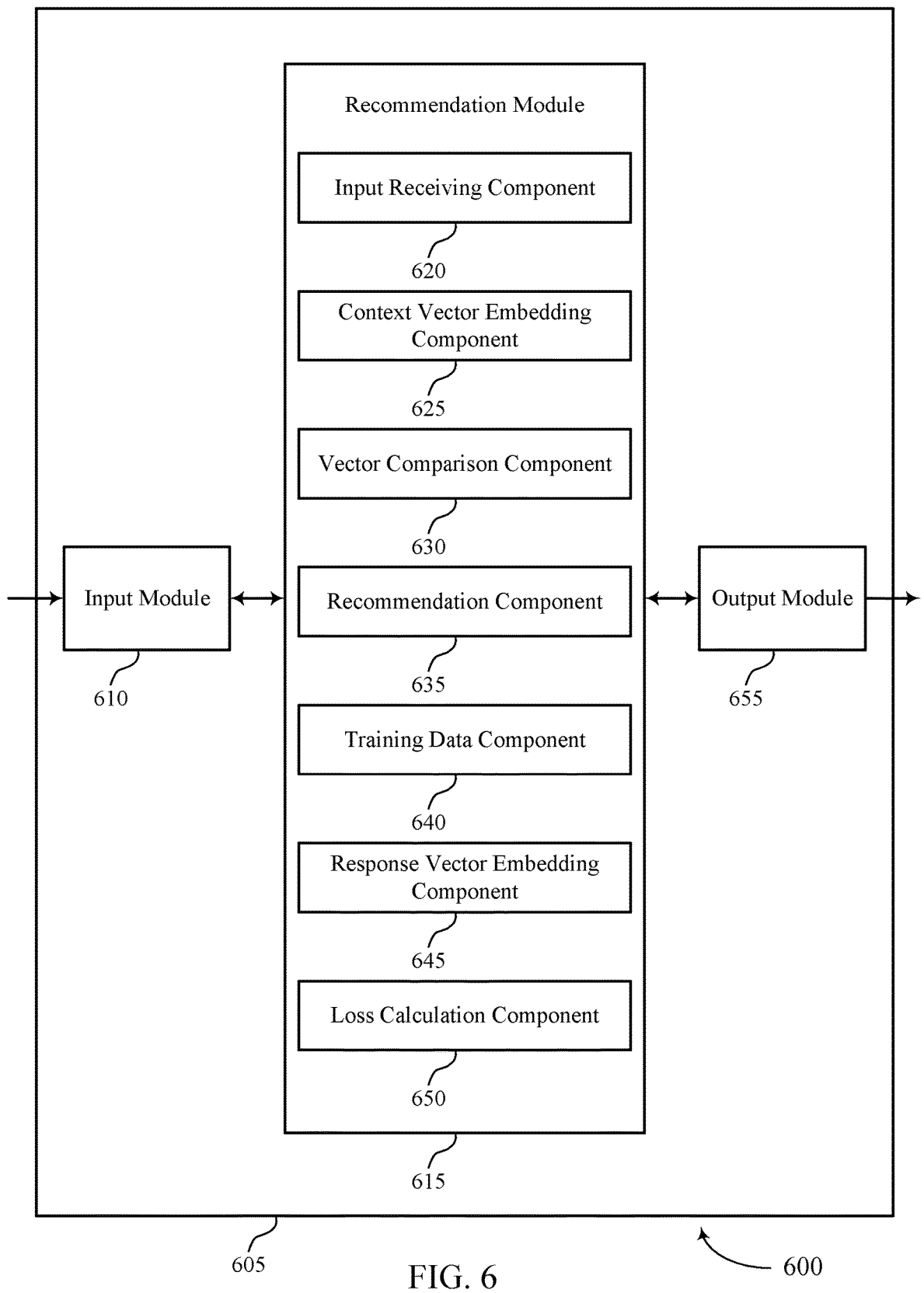
FIG. 6 shows a block diagram of an apparatus that supports a response recommendation system in accordance with aspects of the present disclosure.

FIG. 6 shows a block diagram 600 of an apparatus 605 that supports a response recommendation system in accordance with aspects of the present disclosure. The apparatus 605 may include an input module 610, a recommendation module 615, and an output module 655. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the recommendation module 615 to support response recommendation system. In some cases, the input module 610 may be a component of an input/output (I/O) controller 815 as described with reference to FIG. 8.

The recommendation module 615 may include an input receiving component 620, a context vector embedding component 625, a vector comparison component 630, a recommendation component 635, a training data component 640, a response vector embedding component 645, and a loss calculation component 650. The recommendation module 615 may be an example of aspects of the recommendation module 705 or 810 described with reference to FIGS. 7 and 8.

The recommendation module 615 and/or at least some of its various sub-components may be implemented in hardware, software executed by a processor, firmware, or any combination thereof. If implemented in software executed by a processor, the functions of the recommendation module 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The recommendation module 615 and/or at least some of its various sub-components may be physically located at various positions, including being distributed such that portions of functions are implemented at different physical locations by one or more physical devices. In some examples, the recommendation module 615 and/or at least some of its various sub-components may be a separate and distinct component in accordance with various aspects of the present disclosure. In other examples, the recommendation module 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The input receiving component 620 may receive an input including a string of text at an interactive conversation service, the input received during a conversation session at the interactive conversation service.

The context vector embedding component 625 may generate, responsive to receiving the input, a context vector based on a set of inputs corresponding to the conversation session, the set of inputs including at least the received input.

The vector comparison component 630 may calculate a set of similarity scores between the context vector and a set of response vectors, the set of response vectors including at least one response vector based on a custom response input by a user of the interactive conversation service.

The recommendation component 635 may select one or more responses corresponding to one or more of the set of response vectors for input at the interactive conversation service, the one or more responses selected based on the set of similarity scores calculated between the context vector and the set of response vectors.

The training data component 640 may generate training data based on a corpus of conversation data including sequences of inputs corresponding to conversation sessions at the interactive conversation service, the training data including a set of context-response pairs and a label corresponding to each of the set of context-response pairs, a context of a context-response pair including a sequence of inputs during a conversation session, and a response being a subsequent input by an agent during the conversation session, the training data generated by.

The context vector embedding component 625 may generate a context vector for each context of each context-response pair of the set of context-response pairs using a context word embedding function.

The response vector embedding component 645 may generate a response vector for each response of each context-response pair of the set of context-response pairs using a response word embedding function.

The vector comparison component 630 may calculate a similarity score for each context-response pair of the set of context-response pairs by comparing the context vector and the response vector of each context-response pair.

The loss calculation component 650 may determine a loss for each context-response pair of the set of context-response pairs based at least on the similarity score and the label corresponding to each context-response pair of the set of context-response pairs.

The output module 655 may manage output signals for the apparatus 605. For example, the output module 655 may receive signals from other components of the apparatus 605, such as the recommendation module 615, and may transmit these signals to other components or devices. In some specific examples, the output module 655 may transmit output signals for display in a user interface, for storage in a database or data store, for further processing at a server or server cluster, or for any other processes at any number of devices or systems. In some cases, the output module 655 may be a component of an I/O controller 815 as described with reference to FIG. 8.

Figure 7:
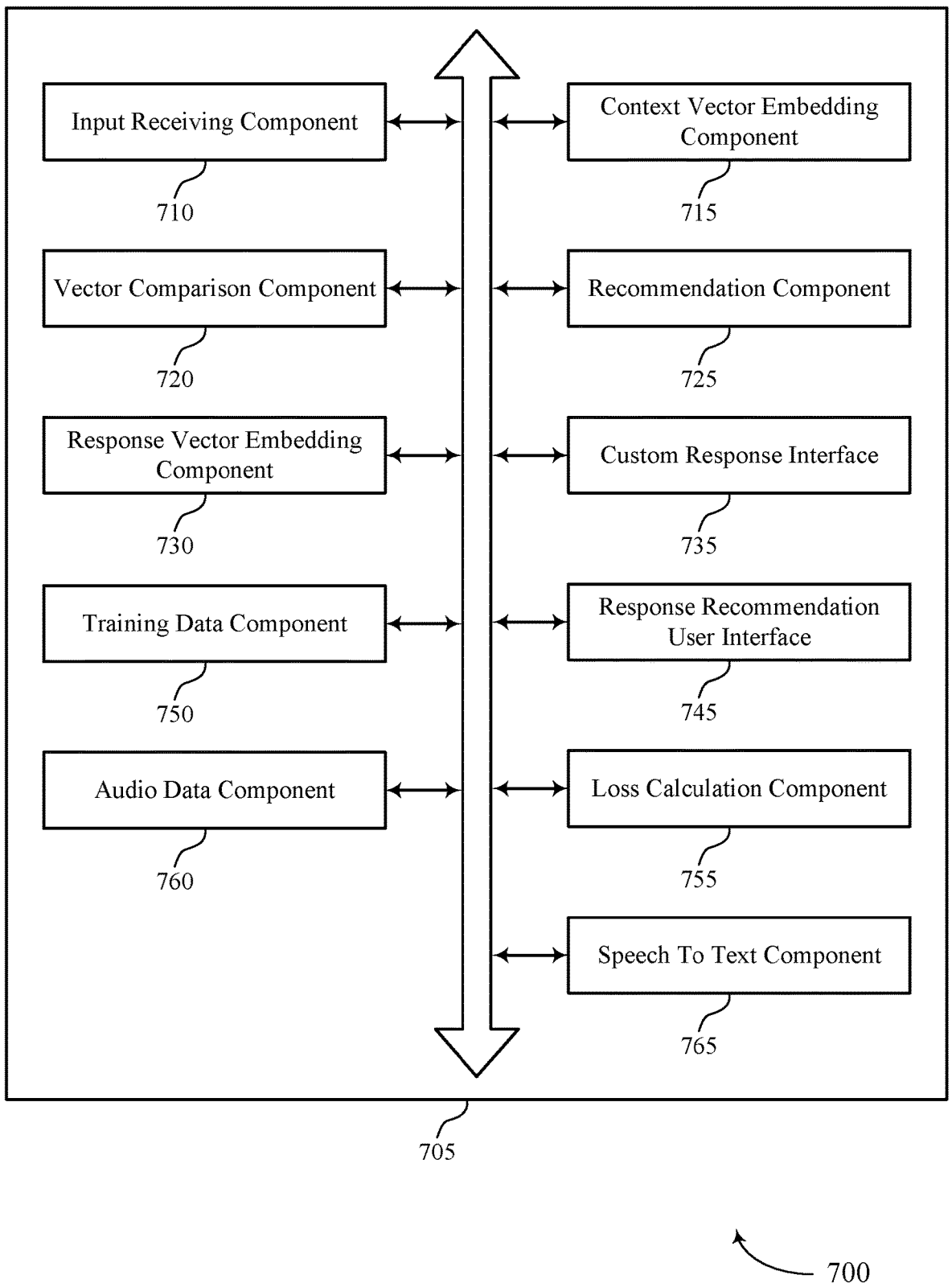
FIG. 7 shows a block diagram of a recommendation module that supports a response recommendation system in accordance with aspects of the present disclosure.

FIG. 7 shows a block diagram 700 of a recommendation module 705 that supports a response recommendation system in accordance with aspects of the present disclosure. The recommendation module 705 may be an example of aspects of a recommendation module 615 or a recommendation module 810 described herein. The recommendation module 705 may include an input receiving component 710, a context vector embedding component 715, a vector comparison component 720, a recommendation component 725, a response vector embedding component 730, a custom response interface 735, a response recommendation user interface 745, a training data component 745, a loss calculation component 750, an audio data component 755, and a speech to text component 760. Each of these modules may communicate, directly or indirectly, with one another (e.g., via one or more buses).

The input receiving component 710 may receive an input including a string of text at an interactive conversation service, the input received during a conversation session at the interactive conversation service.

The context vector embedding component 715 may generate, responsive to receiving the input, a context vector based on a set of inputs corresponding to the conversation session, the set of inputs including at least the received input.

In some examples, the context vector embedding component 715 may generate a context vector for each context of each context-response pair of the set of context-response pairs using a context word embedding function.

In some examples, the context vector embedding component 715 may generate the context vector using a word embedding function trained on a corpus of conversation data corresponding to conversation sessions at instances of the interactive conversation service.

In some examples, the context vector embedding component 715 may generate a context vector for each context of each context-response pair of the set of context-response pairs using a context word embedding function.

The vector comparison component 720 may calculate a set of similarity scores between the context vector and a set of response vectors, the set of response vectors including at least one response vector based on a custom response input by a user of the interactive conversation service.

In some examples, the vector comparison component 720 may calculate a similarity score for each context-response pair of the set of context-response pairs by comparing the context vector and the response vector of each context-response pair.

In some examples, the vector comparison component 720 may calculate a similarity score for each context-response pair of the set of context-response pairs by comparing the context vector and the response vector of each context-response pair.

The recommendation component 725 may select one or more responses corresponding to one or more of the set of response vectors for input at the interactive conversation service, the one or more responses selected based on the set of similarity scores calculated between the context vector and the set of response vectors.

In some examples, the recommendation component 725 may recommend the selected response to the user of the interactive conversation service.

The response vector embedding component 730 may generate a response vector for each response of each context-response pair of the set of context-response pairs using a response word embedding function.

In some examples, the response vector embedding component 730 may generate the set of response vectors using a word embedding function trained on a corpus of conversation data corresponding to conversation sessions at instances of the interactive conversation service.

In some examples, the response vector embedding component 730 may generate a response vector for each response of each context-response pair of the set of context-response pairs using a response word embedding function.

The training data component 745 may generate training data based on a corpus of conversation data including sequences of inputs corresponding to conversation sessions at the interactive conversation service, the training data including a set of context-response pairs and a label corresponding to each of the set of context-response pairs, a context of a context-response pair including a sequence of inputs during a conversation session, and a response being a subsequent input by an agent during the conversation session, the training data generated by.

In some examples, the training data component 745 may generate training data based on a corpus of conversation data including sequences of inputs corresponding to conversation sessions at the interactive conversation service, the training data including a set of context-response pairs and a label corresponding to each of the set of context-response pairs, a context of a context-response pair including a sequence of inputs during an arbitrary conversation session, and a response being a subsequent input by an agent during the arbitrary conversation session, the training data generated by.

In some cases, the first set of sequential inputs and the second set of sequential inputs include a same number of inputs.

In some cases, the context vector for each the set of context-response pairs is a vector of a first length and the response vector for each response of each context-response pair is a vector of a second length.

In some cases, the sequences of inputs include one or more words.

The loss calculation component 750 may determine a loss for each context-response pair of the set of context-response pairs based at least on the similarity score and the label corresponding to each context-response pair of the set of context-response pairs.

In some examples, the loss calculation component 750 may determine a loss for each context-response pair of the set of context-response pairs based at least on the similarity score and the label corresponding to each context-response pair of the set of context-response pairs.

The custom response interface 735 may receive the custom response from the user of the interactive conversation service during the conversation session.

In some cases, the custom response is one of a set of custom responses customized for the user, a group of users, an organization, or a combination thereof.

In some cases, the selected response is recommended to an agent for responding to the input.

The response recommendation user interface 745 may display the selected response at a user interface of a user device corresponding to the user.

The audio data component 755 may receive audio data including voice data at the interactive conversation service.

The speech to text component 760 may convert the audio data into the input including the string of text.

Figure 8:
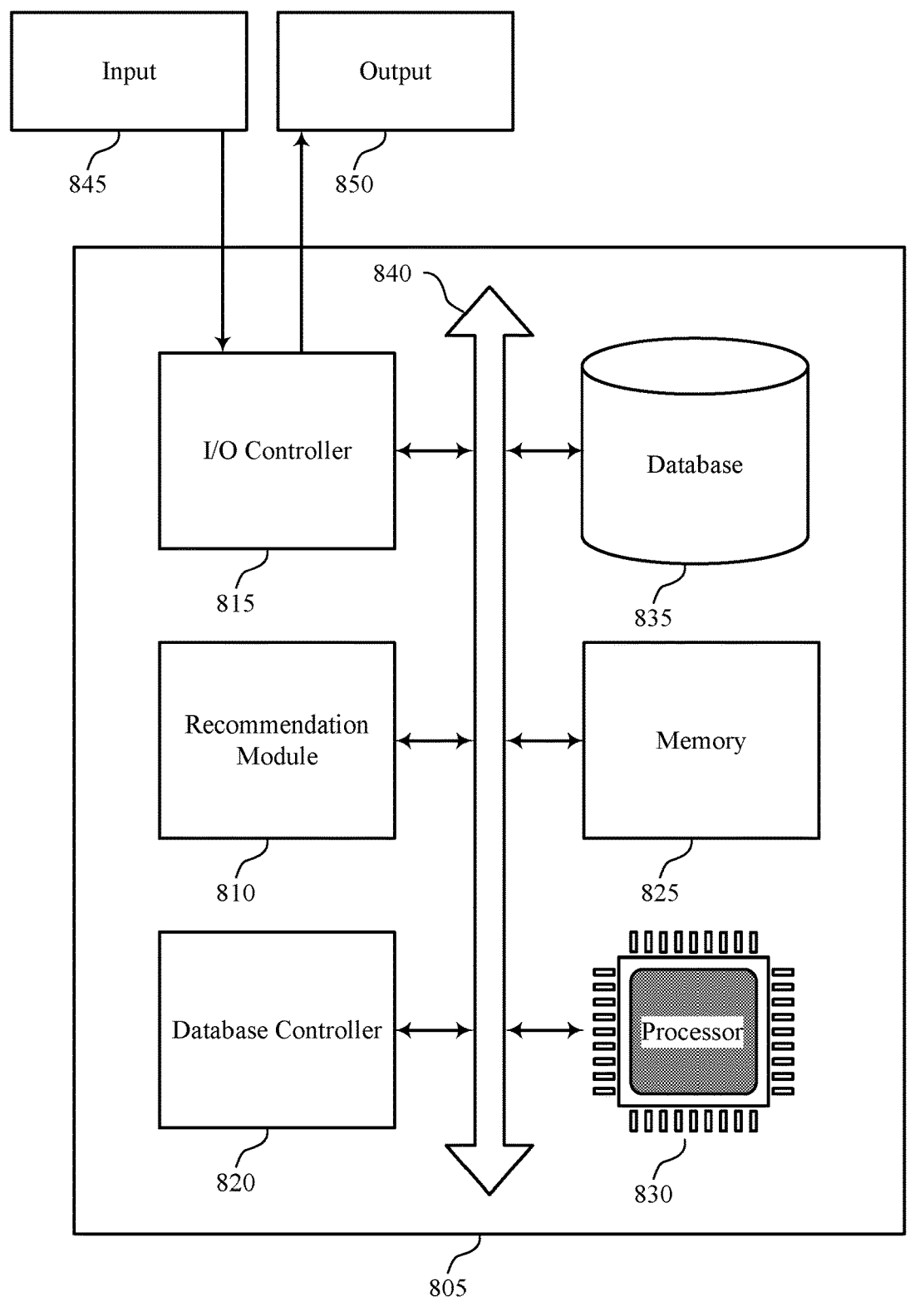
FIG. 8 shows a diagram of a system including a device that supports a response recommendation system in accordance with aspects of the present disclosure.

FIG. 8 shows a diagram of a system 800 including a device 805 that supports a response recommendation system in accordance with aspects of the present disclosure. The device 805 may be an example of or include the components of an analytical data store or an apparatus 605 as described herein. The device 805 may include components for bi-directional data communications including components for transmitting and receiving communications, including a recommendation module 810, an I/O controller 815, a database controller 820, memory 825, a processor 830, and a database 835. These components may be in electronic communication via one or more buses (e.g., bus 840).

The recommendation module 810 may be an example of a recommendation module 615 or 705 as described herein. For example, the recommendation module 810 may perform any of the methods or processes described herein with reference to FIGS. 6 and 7. In some cases, the recommendation module 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting response recommendation system).

Figure 9:
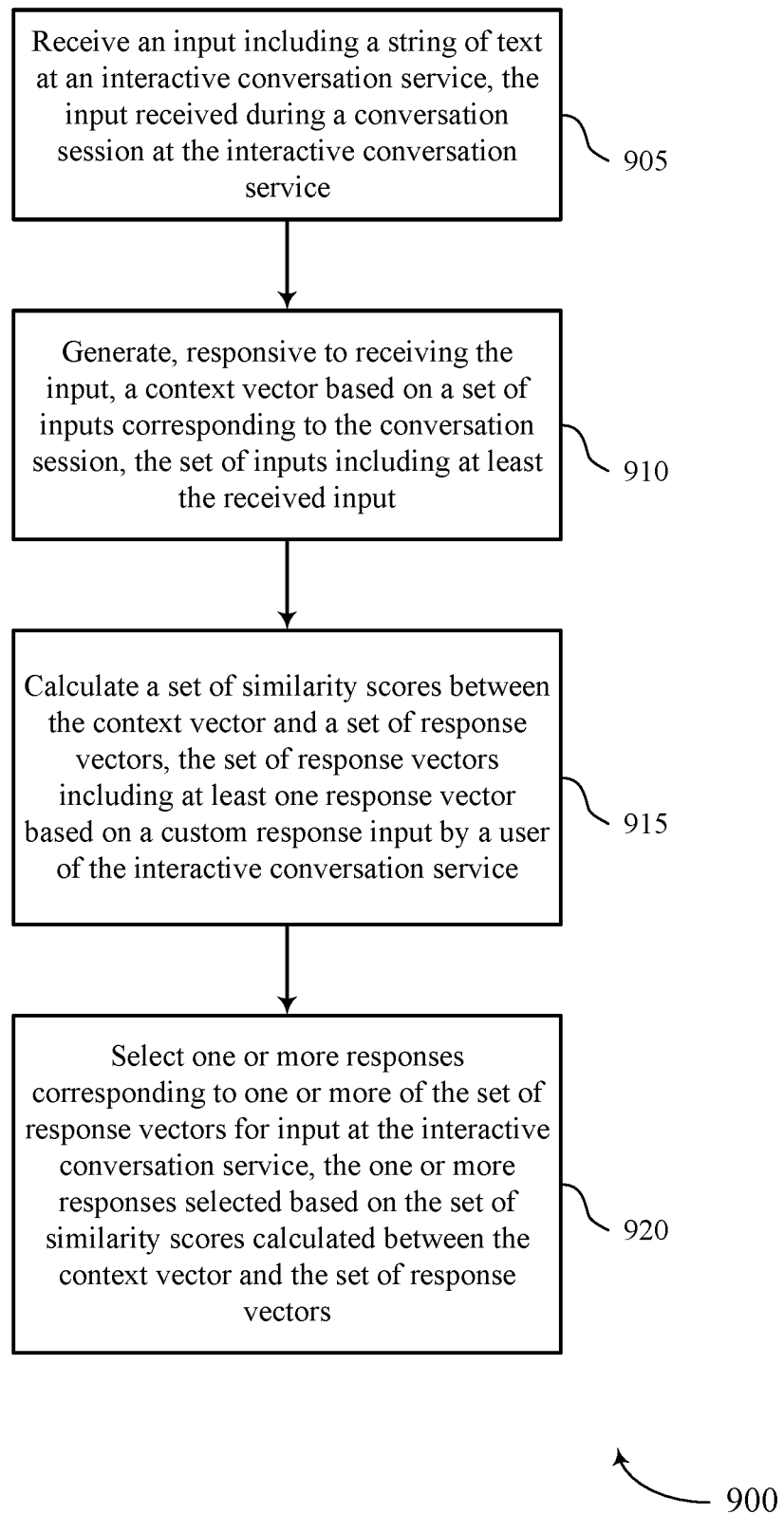
FIGS. 9 through 13 show flowcharts illustrating methods that support response recommendation system in accordance with aspects of the present disclosure.

FIG. 9 shows a flowchart illustrating a method 1200 that supports a response recommendation system in accordance with aspects of the present disclosure. The operations of method 1200 may be implemented by an analytical data store or its components as described herein. For example, the operations of method 1200 may be performed by a recommendation module as described with reference to FIGS. 6 through 8. In some examples, an analytical data store may execute a set of instructions to control the functional elements of the analytical data store to perform the functions described herein. Additionally or alternatively, an analytical data store may perform aspects of the functions described herein using special-purpose hardware.

At 1205, the analytical data store may receive an input including a string of text at an interactive conversation service, the input received during a conversation session at the interactive conversation service. The operations of 1205 may be performed according to the methods described herein. In some examples, aspects of the operations of 1205 may be performed by an input receiving component as described with reference to FIGS. 6 through 8.

At 1210, the analytical data store may generate, responsive to receiving the input, a context vector based on a set of inputs corresponding to the conversation session, the set of inputs including at least the received input. The operations of 1210 may be performed according to the methods described herein. In some examples, aspects of the operations of 1210 may be performed by a context vector embedding component as described with reference to FIGS. 6 through 8.

At 1215, the analytical data store may calculate a set of similarity scores between the context vector and a set of response vectors, the set of response vectors including at least one response vector based on a custom response input by a user of the interactive conversation service. The operations of 1215 may be performed according to the methods described herein. In some examples, aspects of the operations of 1215 may be performed by a vector comparison component as described with reference to FIGS. 6 through 8.

At 1220, the analytical data store may select one or more responses corresponding to one or more of the set of response vectors for input at the interactive conversation service, the one or more responses selected based on the set of similarity scores calculated between the context vector and the set of response vectors. The operations of 1220 may be performed according to the methods described herein. In some examples, aspects of the operations of 1220 may be performed by a recommendation component as described with reference to FIGS. 6 through 8.

Figure 10:
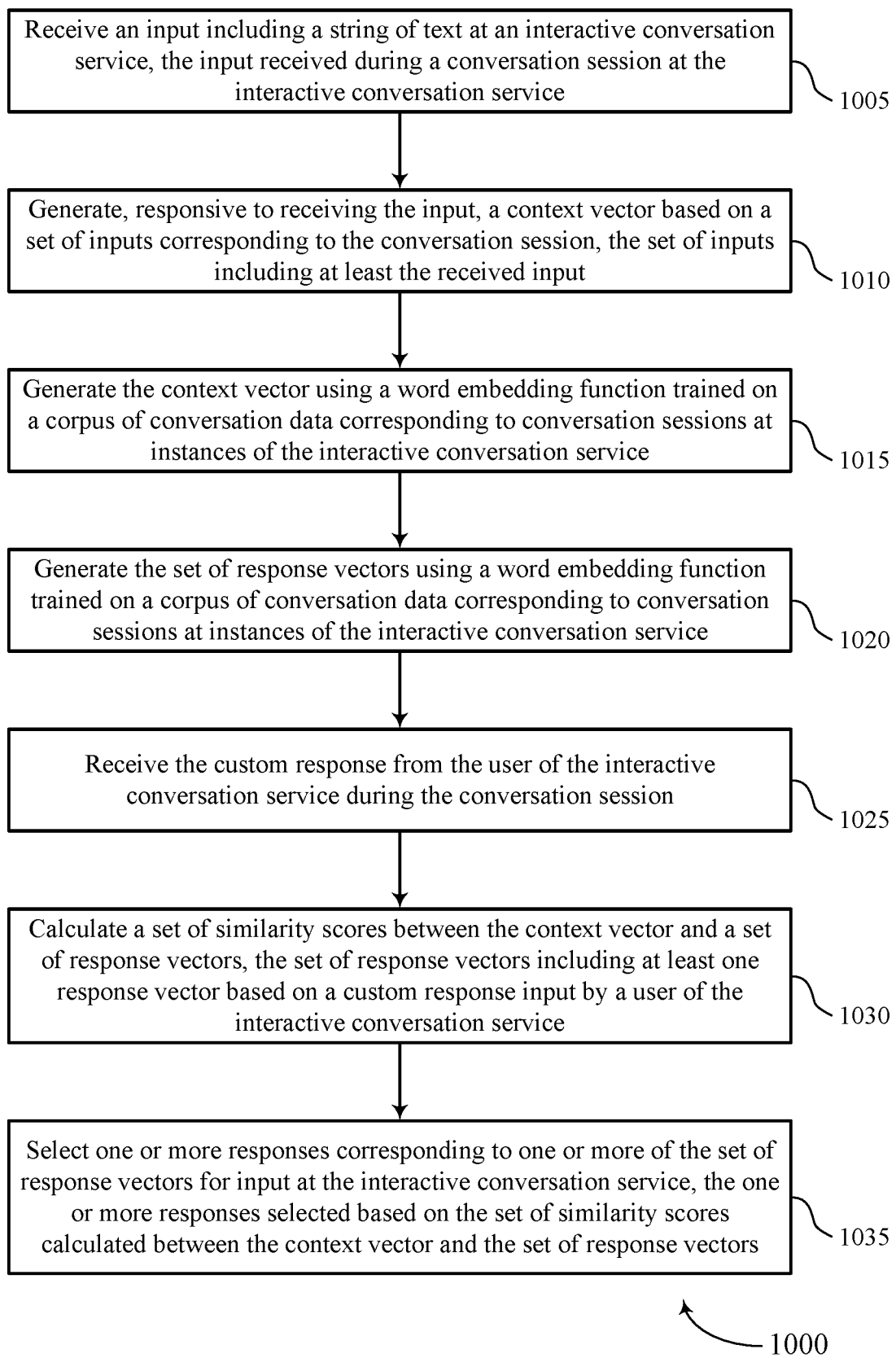

FIG. 10 shows a flowchart illustrating a method 1000 that supports a response recommendation system in accordance with aspects of the present disclosure. The operations of method 1000 may be implemented by an analytical data store or its components as described herein. For example, the operations of method 1000 may be performed by a recommendation module as described with reference to FIGS. 6 through 8. In some examples, an analytical data store may execute a set of instructions to control the functional elements of the analytical data store to perform the functions described herein. Additionally or alternatively, an analytical data store may perform aspects of the functions described herein using special-purpose hardware.

At 1005, the analytical data store may receive an input including a string of text at an interactive conversation service, the input received during a conversation session at the interactive conversation service. The operations of 1005 may be performed according to the methods described herein. In some examples, aspects of the operations of 1005 may be performed by an input receiving component as described with reference to FIGS. 6 through 8.

At 1010, the analytical data store may generate, responsive to receiving the input, a context vector based on a set of inputs corresponding to the conversation session, the set of inputs including at least the received input. The operations of 1010 may be performed according to the methods described herein. In some examples, aspects of the operations of 1010 may be performed by a context vector embedding component as described with reference to FIGS. 6 through 8.

At 1015, the analytical data store may generate the context vector using a word embedding function trained on a corpus of conversation data corresponding to conversation sessions at instances of the interactive conversation service. The operations of 1015 may be performed according to the methods described herein. In some examples, aspects of the operations of 1015 may be performed by a context vector embedding component as described with reference to FIGS. 6 through 8.

At 1020, the analytical data store may generate the set of response vectors using a word embedding function trained on a corpus of conversation data corresponding to conversation sessions at instances of the interactive conversation service. The operations of 1020 may be performed according to the methods described herein. In some examples, aspects of the operations of 1020 may be performed by a response vector embedding component as described with reference to FIGS. 6 through 8.

At 1025, the analytical data store may receive the custom response from the user of the interactive conversation service during the conversation session. The operations of 1025 may be performed according to the methods described herein. In some examples, aspects of the operations of 1025 may be performed by a custom response interface as described with reference to FIGS. 6 through 8.

At 1030, the analytical data store may calculate a set of similarity scores between the context vector and a set of response vectors, the set of response vectors including at least one response vector based on a custom response input by a user of the interactive conversation service. The operations of 1030 may be performed according to the methods described herein. In some examples, aspects of the operations of 1030 may be performed by a vector comparison component as described with reference to FIGS. 6 through 8.

At 1035, the analytical data store may select one or more responses corresponding to one or more of the set of response vectors for input at the interactive conversation service, the one or more responses selected based on the set of similarity scores calculated between the context vector and the set of response vectors. The operations of 1035 may be performed according to the methods described herein. In some examples, aspects of the operations of 1035 may be performed by a recommendation component as described with reference to FIGS. 6 through 8.

Figure 11:
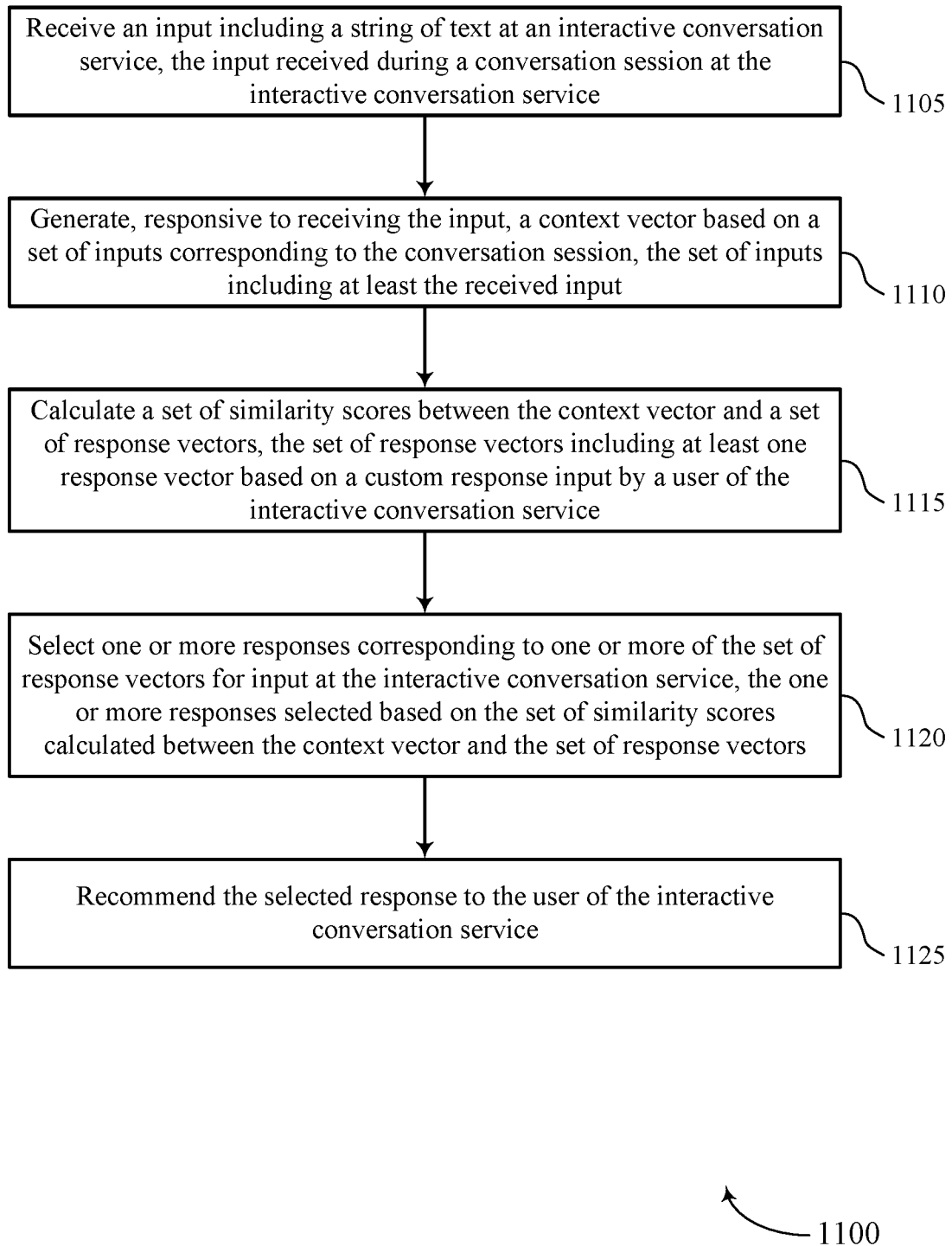

FIG. 11 shows a flowchart illustrating a method 1100 that supports a response recommendation system in accordance with aspects of the present disclosure. The operations of method 1100 may be implemented by an analytical data store or its components as described herein. For example, the operations of method 1100 may be performed by a recommendation module as described with reference to FIGS. 6 through 8. In some examples, an analytical data store may execute a set of instructions to control the functional elements of the analytical data store to perform the functions described herein. Additionally or alternatively, an analytical data store may perform aspects of the functions described herein using special-purpose hardware.

At 1105, the analytical data store may receive an input including a string of text at an interactive conversation service, the input received during a conversation session at the interactive conversation service. The operations of 1105 may be performed according to the methods described herein. In some examples, aspects of the operations of 1105 may be performed by an input receiving component as described with reference to FIGS. 6 through 8.

At 1110, the analytical data store may generate, responsive to receiving the input, a context vector based on a set of inputs corresponding to the conversation session, the set of inputs including at least the received input. The operations of 1110 may be performed according to the methods described herein. In some examples, aspects of the operations of 1110 may be performed by a context vector embedding component as described with reference to FIGS. 6 through 8.

At 1115, the analytical data store may calculate a set of similarity scores between the context vector and a set of response vectors, the set of response vectors including at least one response vector based on a custom response input by a user of the interactive conversation service. The operations of 1115 may be performed according to the methods described herein. In some examples, aspects of the operations of 1115 may be performed by a vector comparison component as described with reference to FIGS. 6 through 8.

At 1120, the analytical data store may select one or more responses corresponding to one or more of the set of response vectors for input at the interactive conversation service, the one or more responses selected based on the set of similarity scores calculated between the context vector and the set of response vectors. The operations of 1120 may be performed according to the methods described herein. In some examples, aspects of the operations of 1120 may be performed by a recommendation component as described with reference to FIGS. 6 through 8.

At 1125, the analytical data store may recommend the selected response to the user of the interactive conversation service. The operations of 1125 may be performed according to the methods described herein. In some examples, aspects of the operations of 1125 may be performed by a recommendation component as described with reference to FIGS. 6 through 8.

Figure 12:
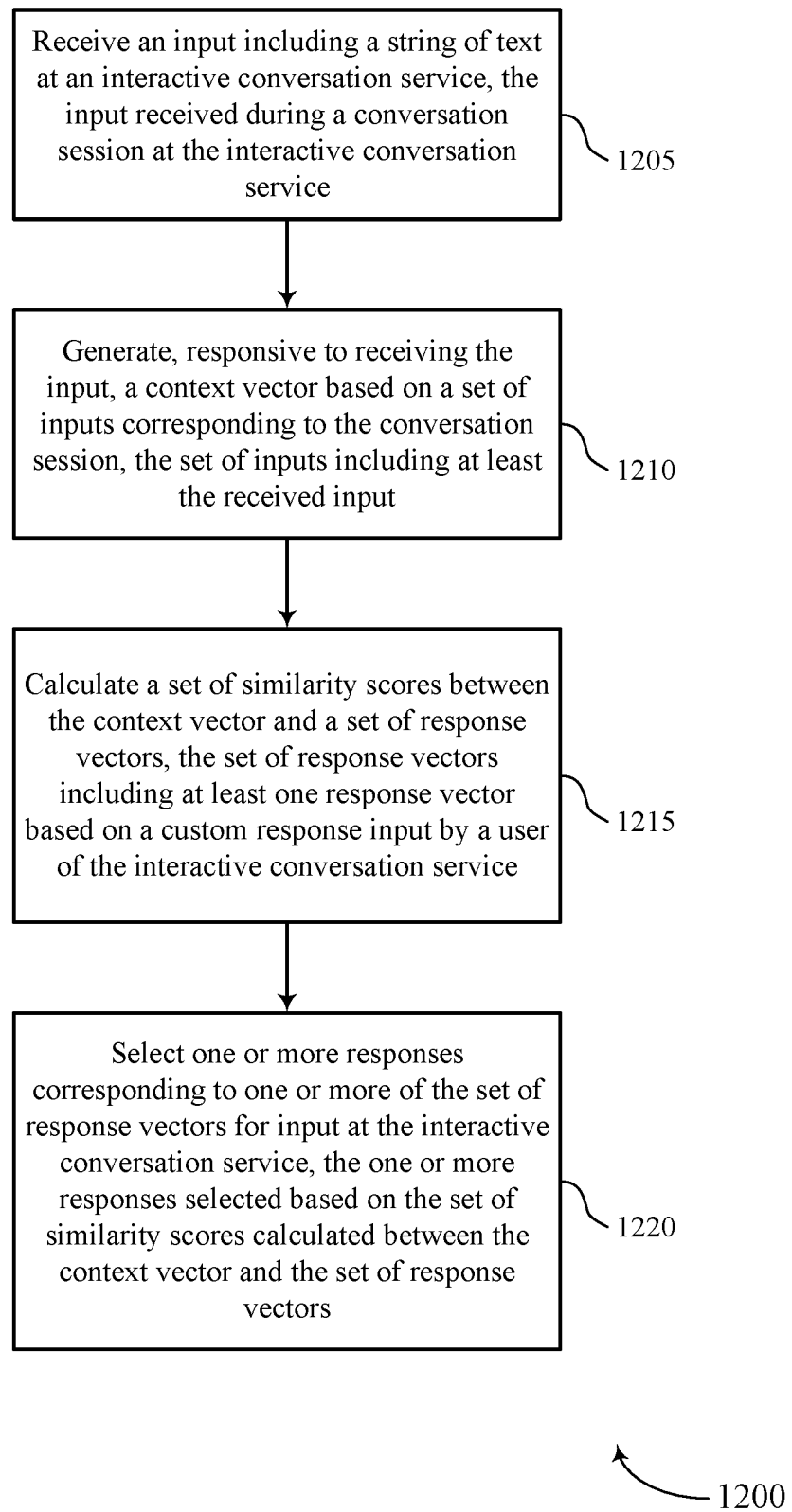

FIG. 12 shows a flowchart illustrating a method 1200 that supports a response recommendation system in accordance with aspects of the present disclosure. The operations of method 1200 may be implemented by an analytical data store or its components as described herein. For example, the operations of method 1200 may be performed by a recommendation module as described with reference to FIGS. 6 through 8. In some examples, an analytical data store may execute a set of instructions to control the functional elements of the analytical data store to perform the functions described herein. Additionally or alternatively, an analytical data store may perform aspects of the functions described herein using special-purpose hardware.

At 1205, the analytical data store may receive an input including a string of text at an interactive conversation service, the input received during a conversation session at the interactive conversation service. The operations of 1205 may be performed according to the methods described herein. In some examples, aspects of the operations of 1205 may be performed by an input receiving component as described with reference to FIGS. 6 through 8.

At 1210, the analytical data store may generate, responsive to receiving the input, a context vector based on a set of inputs corresponding to the conversation session, the set of inputs including at least the received input. The operations of 1210 may be performed according to the methods described herein. In some examples, aspects of the operations of 1210 may be performed by a context vector embedding component as described with reference to FIGS. 6 through 8.

At 1215, the analytical data store may calculate a set of similarity scores between the context vector and a set of response vectors, the set of response vectors including at least one response vector based on a custom response input by a user of the interactive conversation service. The operations of 1215 may be performed according to the methods described herein. In some examples, aspects of the operations of 1215 may be performed by a vector comparison component as described with reference to FIGS. 6 through 8.

At 1220, the analytical data store may select one or more responses corresponding to one or more of the sets of response vectors for input at the interactive conversation service, the one or more responses selected based on the set of similarity scores calculated between the context vector and the set of response vectors. The operations of 1220 may be performed according to the methods described herein. In some examples, aspects of the operations of 1220 may be performed by a recommendation component as described with reference to FIGS. 6 through 8.

Figure 13:
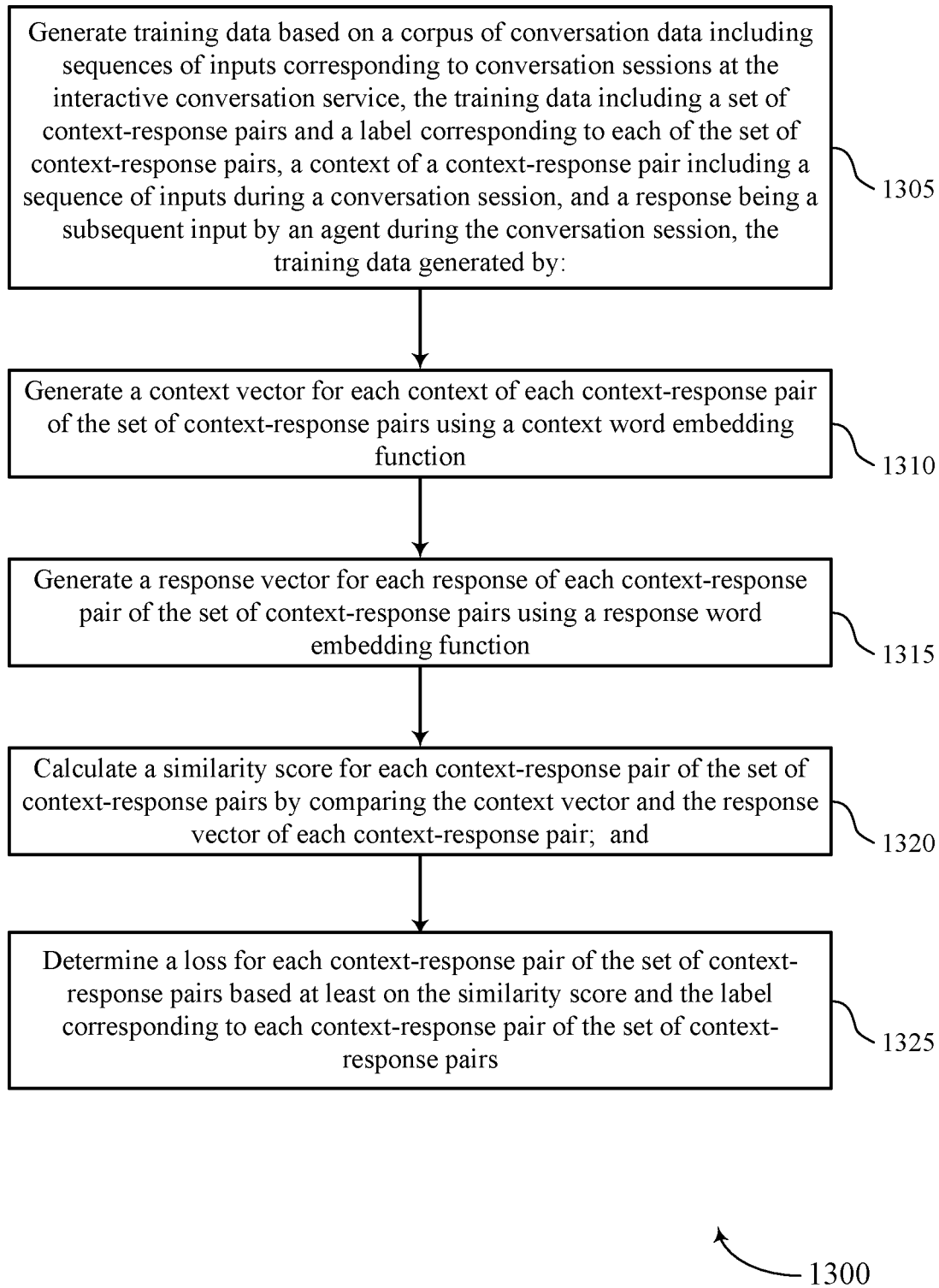

FIG. 13 shows a flowchart illustrating a method 1300 that supports a response recommendation system in accordance with aspects of the present disclosure. The operations of method 1300 may be implemented by an analytical data store or its components as described herein. For example, the operations of method 1300 may be performed by a recommendation module as described with reference to FIGS. 6 through 8. In some examples, an analytical data store may execute a set of instructions to control the functional elements of the analytical data store to perform the functions described herein. Additionally or alternatively, an analytical data store may perform aspects of the functions described herein using special-purpose hardware.

At 1305, the analytical data store may generate training data based on a corpus of conversation data including sequences of inputs corresponding to conversation sessions at the interactive conversation service, the training data including a set of context-response pairs and a label corresponding to each of the set of context-response pairs, a context of a context-response pair including a sequence of inputs during a conversation session, and a response being a subsequent input by an agent during the conversation session, the training data generated by. The operations of 1305 may be performed according to the methods described herein. In some examples, aspects of the operations of 1305 may be performed by a training data component as described with reference to FIGS. 6 through 8.

At 1310, the analytical data store may generate a context vector for each context of each context-response pair of the set of context-response pairs using a context word embedding function. The operations of 1310 may be performed according to the methods described herein. In some examples, aspects of the operations of 1310 may be performed by a context vector embedding component as described with reference to FIGS. 6 through 8.

At 1315, the analytical data store may generate a response vector for each response of each context-response pair of the set of context-response pairs using a response word embedding function. The operations of 1315 may be performed according to the methods described herein. In some examples, aspects of the operations of 1315 may be performed by a response vector embedding component as described with reference to FIGS. 6 through 8.

At 1320, the analytical data store may calculate a similarity score for each context-response pair of the set of context-response pairs by comparing the context vector and the response vector of each context-response pair; and. The operations of 1320 may be performed according to the methods described herein. In some examples, aspects of the operations of 1320 may be performed by a vector comparison component as described with reference to FIGS. 6 through 8.

At 1325, the analytical data store may determine a loss for each context-response pair of the set of context-response pairs based at least on the similarity score and the label corresponding to each context-response pair of the set of context-response pairs. The operations of 1325 may be performed according to the methods described herein. In some examples, aspects of the operations of 1325 may be performed by a loss calculation component as described with reference to FIGS. 6 through 8.

A method is described. The method may include receiving an input including a string of text at an interactive conversation service, the input received during a conversation session at the interactive conversation service, generating, responsive to receiving the input, a context vector based on a set of inputs corresponding to the conversation session, the set of inputs including at least the received input, calculating a set of similarity scores between the context vector and a set of response vectors, the set of response vectors including at least one response vector based on a custom response input by a user of the interactive conversation service, and selecting one or more responses corresponding to one or more of the set of response vectors for input at the interactive conversation service, the one or more responses selected based on the set of similarity scores calculated between the context vector and the set of response vectors.

An apparatus is described. The apparatus may include a processor, memory in electronic communication with the processor, and instructions stored in the memory. The instructions may be executable by the processor to cause the apparatus to receive an input including a string of text at an interactive conversation service, the input received during a conversation session at the interactive conversation service, generate, responsive to receiving the input, a context vector based on a set of inputs corresponding to the conversation session, the set of inputs including at least the received input, calculate a set of similarity scores between the context vector and a set of response vectors, the set of response vectors including at least one response vector based on a custom response input by a user of the interactive conversation service, and select one or more responses corresponding to one or more of the set of response vectors for input at the interactive conversation service, the one or more responses selected based on the set of similarity scores calculated between the context vector and the set of response vectors.

Another apparatus is described. The apparatus may include means for receiving an input including a string of text at an interactive conversation service, the input received during a conversation session at the interactive conversation service, generating, responsive to receiving the input, a context vector based on a set of inputs corresponding to the conversation session, the set of inputs including at least the received input, calculating a set of similarity scores between the context vector and a set of response vectors, the set of response vectors including at least one response vector based on a custom response input by a user of the interactive conversation service, and selecting one or more responses corresponding to one or more of the set of response vectors for input at the interactive conversation service, the one or more responses selected based on the set of similarity scores calculated between the context vector and the set of response vectors.

A non-transitory computer-readable medium storing code is described. The code may include instructions executable by a processor to receive an input including a string of text at an interactive conversation service, the input received during a conversation session at the interactive conversation service, generate, responsive to receiving the input, a context vector based on a set of inputs corresponding to the conversation session, the set of inputs including at least the received input, calculate a set of similarity scores between the context vector and a set of response vectors, the set of response vectors including at least one response vector based on a custom response input by a user of the interactive conversation service, and select one or more responses corresponding to one or more of the set of response vectors for input at the interactive conversation service, the one or more responses selected based on the set of similarity scores calculated between the context vector and the set of response vectors.

Some examples of the method, apparatuses, and non-transitory computer-readable medium described herein may further include operations, features, means, or instructions for generating the context vector using a word embedding function trained on a corpus of conversation data corresponding to conversation sessions at instances of the interactive conversation service.

Some examples of the method, apparatuses, and non-transitory computer-readable medium described herein may further include operations, features, means, or instructions for generating the set of response vectors using a word embedding function trained on a corpus of conversation data corresponding to conversation sessions at instances of the interactive conversation service.

Some examples of the method, apparatuses, and non-transitory computer-readable medium described herein may further include operations, features, means, or instructions for receiving the custom response from the user of the interactive conversation service during the conversation session.

In some examples of the method, apparatuses, and non-transitory computer-readable medium described herein, the custom response may be one of a set of custom responses customized for the user, a group of users, an organization, or a combination thereof.

In some examples of the method, apparatuses, and non-transitory computer-readable medium described herein, the selected response may be recommended to an agent for responding to the input.

Some examples of the method, apparatuses, and non-transitory computer-readable medium described herein may further include operations, features, means, or instructions for recommending the selected response to the user of the interactive conversation service.

Some examples of the method, apparatuses, and non-transitory computer-readable medium described herein may further include operations, features, means, or instructions for displaying the selected response at a user interface of a user device corresponding to the user.

Some examples of the method, apparatuses, and non-transitory computer-readable medium described herein may further include operations, features, means, or instructions for generating training data based on a corpus of conversation data including sequences of inputs corresponding to conversation sessions at the interactive conversation service, the training data including a set of context-response pairs and a label corresponding to each of the set of context-response pairs, a context of a context-response pair including a sequence of inputs during an arbitrary conversation session, and a response being a subsequent input by an agent during the arbitrary conversation session, the training data generated by, generating a context vector for each context of each context-response pair of the set of context-response pairs using a context word embedding function, generating a response vector for each response of each context-response pair of the set of context-response pairs using a response word embedding function, calculating a similarity score for each context-response pair of the set of context-response pairs by comparing the context vector and the response vector of each context-response pair; and determining a loss for each context-response pair of the set of context-response pairs based at least on the similarity score and the label corresponding to each context-response pair of the set of context-response pairs.

Some examples of the method, apparatuses, and non-transitory computer-readable medium described herein may further include operations, features, means, or instructions for receiving audio data including voice data at the interactive conversation service and converting the audio data into the input including the string of text.

A method is described. The method may include generating training data based on a corpus of conversation data including sequences of inputs corresponding to conversation sessions at the interactive conversation service, the training data including a set of context-response pairs and a label corresponding to each of the set of context-response pairs, a context of a context-response pair including a sequence of inputs during a conversation session, and a response being a subsequent input by an agent during the conversation session, the training data generated by, generating a context vector for each context of each context-response pair of the set of context-response pairs using a context word embedding function, generating a response vector for each response of each context-response pair of the set of context-response pairs using a response word embedding function, calculating a similarity score for each context-response pair of the set of context-response pairs by comparing the context vector and the response vector of each context-response pair; and, and determining a loss for each context-response pair of the set of context-response pairs based at least on the similarity score and the label corresponding to each context-response pair of the set of context-response pairs.

An apparatus is described. The apparatus may include a processor, memory in electronic communication with the processor, and instructions stored in the memory. The instructions may be executable by the processor to cause the apparatus to generate training data based on a corpus of conversation data including sequences of inputs corresponding to conversation sessions at the interactive conversation service, the training data including a set of context-response pairs and a label corresponding to each of the set of context-response pairs, a context of a context-response pair including a sequence of inputs during a conversation session, and a response being a subsequent input by an agent during the conversation session, the training data generated by, generate a context vector for each context of each context-response pair of the set of context-response pairs using a context word embedding function, generate a response vector for each response of each context-response pair of the set of context-response pairs using a response word embedding function, calculate a similarity score for each context-response pair of the set of context-response pairs by comparing the context vector and the response vector of each context-response pair; and, and determine a loss for each context-response pair of the set of context-response pairs based at least on the similarity score and the label corresponding to each context-response pair of the set of context-response pairs.

Another apparatus is described. The apparatus may include means for generating training data based on a corpus of conversation data including sequences of inputs corresponding to conversation sessions at the interactive conversation service, the training data including a set of context-response pairs and a label corresponding to each of the set of context-response pairs, a context of a context-response pair including a sequence of inputs during a conversation session, and a response being a subsequent input by an agent during the conversation session, the training data generated by, generating a context vector for each context of each context-response pair of the set of context-response pairs using a context word embedding function, generating a response vector for each response of each context-response pair of the set of context-response pairs using a response word embedding function, calculating a similarity score for each context-response pair of the set of context-response pairs by comparing the context vector and the response vector of each context-response pair; and, and determining a loss for each context-response pair of the set of context-response pairs based at least on the similarity score and the label corresponding to each context-response pair of the set of context-response pairs.

A non-transitory computer-readable medium storing code is described. The code may include instructions executable by a processor to generate training data based on a corpus of conversation data including sequences of inputs corresponding to conversation sessions at the interactive conversation service, the training data including a set of context-response pairs and a label corresponding to each of the set of context-response pairs, a context of a context-response pair including a sequence of inputs during a conversation session, and a response being a subsequent input by an agent during the conversation session, the training data generated by, generate a context vector for each context of each context-response pair of the set of context-response pairs using a context word embedding function, generate a response vector for each response of each context-response pair of the set of context-response pairs using a response word embedding function, calculate a similarity score for each context-response pair of the set of context-response pairs by comparing the context vector and the response vector of each context-response pair; and, and determine a loss for each context-response pair of the set of context-response pairs based at least on the similarity score and the label corresponding to each context-response pair of the set of context-response pairs.

In some examples of the method, apparatuses, and non-transitory computer-readable medium described herein, the first set of sequential inputs and the second set of sequential inputs include a same number of inputs.

In some examples of the method, apparatuses, and non-transitory computer-readable medium described herein, the context vector for each the set of context-response pairs may be a vector of a first length and the response vector for each response of each context-response pair may be a vector of a second length.

In some examples of the method, apparatuses, and non-transitory computer-readable medium described herein, the sequences of inputs include one or more words.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:
   receiving an input comprising a string of text at an interactive conversation service, the input received during a conversation session at the interactive conversation service;
   generating, responsive to receiving the input, a context vector based at least in part on a set of inputs corresponding to the conversation session, the set of inputs including at least the received input, the context vector generated using at least one word embedding function trained on a set of training data at least partially generated by:
      for a first conversation session in a corpus of conversation data, selecting a first set of sequential inputs of the first conversation session as a first context of a first context-response pair, selecting an input by an agent that is immediately subsequent to the first set of sequential inputs as a first response of the first context-response pair, and assigning a first value to a first label corresponding to the first context-response pair; and
      for a second conversation session in the corpus of conversation data, selecting a second set of sequential inputs of the second conversation session as a second context of a second context-response pair, selecting a random input of the corpus conversation data as a second response of the second context-response pair, and assigning a second value to a second label corresponding to the second context-response pair;
   calculating a set of similarity scores between the context vector and a set of response vectors, the set of response vectors including at least one response vector based on a custom response input by a user of the interactive conversation service; and
   selecting one or more responses corresponding to one or more of the set of response vectors for input at the interactive conversation service, the one or more responses selected based on the set of similarity scores calculated between the context vector and the set of response vectors.

2. The method of claim 1, further comprising:
   generating the context vector using the at least one word embedding function trained on the corpus of conversation data corresponding to conversation sessions at instances of the interactive conversation service.

3. The method of claim 1, further comprising:
   generating the set of response vectors using the at least one word embedding function trained on the corpus of conversation data corresponding to conversation sessions at instances of the interactive conversation service.

4. The method of claim 1, further comprising:
   receiving the custom response from the user of the interactive conversation service during the conversation session.

5. The method of claim 1, wherein the custom response is one of a set of custom responses customized for the user, a group of users, an organization, or a combination thereof.

6. The method of claim 1, wherein the selected response is recommended to an agent for responding to the input.

7. The method of claim 1, further comprising:
   recommending the selected response to the user of the interactive conversation service.

8. The method of claim 7, further comprising:
   displaying the selected response at a user interface of a user device corresponding to the user.

9. The method of claim 1, wherein the at least one word embedding function is further trained by:
   generating a context vector for each context of each context-response pair of the set of context-response pairs using a context word embedding function of the at least one word embedding function;
   generating a response vector for each response of each context-response pair of the set of context-response pairs using a response word embedding function of the at least one word embedding function;
   calculating a similarity score for each context-response pair of the set of context-response pairs by comparing the context vector and the response vector of each context-response pair; and
   determining a loss for each context-response pair of the set of context-response pairs based at least on the similarity score and the label corresponding to each context-response pair of the set of context-response pairs.

10. The method of claim 1, further comprising:
    receiving audio data comprising voice data at the interactive conversation service; and
    converting the audio data into the input comprising the string of text.

11. A method comprising:
    generating training data based on a corpus of conversation data including sequences of inputs corresponding to conversation sessions at the interactive conversation service, the training data including a set of context-response pairs and a label corresponding to each of the set of context-response pairs, a context of a context-response pair including a sequence of inputs during a conversation session, and a response being a subsequent input by an agent during the conversation session, the training data generated by:
       for a first conversation session in the corpus of conversation data, selecting a first set of sequential inputs of the first conversation session as a first context of a first context-response pair, selecting an input by an agent that is immediately subsequent to the first set of sequential inputs as a first response of the first context-response pair, and assigning a first value to a first label corresponding to the first context-response pair, and
       for a second conversation session in the corpus of conversation data, selecting a second set of sequential inputs of the second conversation session as a second context of a second context-response pair, selecting a random input of the corpus conversation data as a second response of the second context-response pair, and assigning a second value to a second label corresponding to the second context-response pair;
    training at least one word embedding function using the training data by:
       generating a context vector for each context of each context-response pair of the set of context-response pairs using a context word embedding function of the at least one word embedding function;
       generating a response vector for each response of each context-response pair of the set of context-response pairs using a response word embedding function of the at least one word embedding function;

calculating a similarity score for each context-response pair of the set of context-response pairs by comparing the context vector and the response vector of each context-response pair; and determining a loss for each context-response pair of the set of context-response pairs based at least on the similarity score and the label corresponding to each context-response pair of the set of context-response pairs.

12. The method of claim 11, wherein the first set of sequential inputs and the second set of sequential inputs comprise a same number of inputs.

13. The method of claim 11, wherein the context vector for each the set of context-response pairs is a vector of a first length and the response vector for each response of each context-response pair is a vector of a second length.

14. The method of claim 11, wherein the sequences of inputs include one or more words.

15. An apparatus comprising:
a processor,
memory in electronic communication with the processor; and
instructions stored in the memory and executable by the processor to cause the apparatus to:
receive an input comprising a string of text at an interactive conversation service, the input received during a conversation session at the interactive conversation service;
generate, responsive to receiving the input, a context vector based at least in part on a set of inputs corresponding to the conversation session, the set of inputs including at least the received input, the context vector generated using at least one word embedding function trained on a set of training data at least partially generated by:
for a first conversation session in a corpus of conversation data, selecting a first set of sequential inputs of the first conversation session as a first context of a first context-response pair, selecting an input by an agent that is immediately subsequent to the first set of sequential inputs as a first response of the first context-response pair, and assigning a first value to a first label corresponding to the first context-response pair; and
for a second conversation session in the corpus of conversation data, selecting a second set of sequential inputs of the second conversation session as a second context of a second context-response pair, selecting a random input of the corpus conversation data as a second response of the second context-response pair, and assigning a second value to a second label corresponding to the second context-response pair; and
calculate a set of similarity scores between the context vector and a set of response vectors, the set of response vectors including at least one response vector based on a custom response input by a user of the interactive conversation service; and
select one or more responses corresponding to one or more of the set of response vectors for input at the interactive conversation service, the one or more responses selected based on the set of similarity scores calculated between the context vector and the set of response vectors.

16. The apparatus of claim 15, wherein the instructions are further executable by the processor to cause the apparatus to:

generate the context vector using the at least one word embedding function trained on the corpus of conversation data corresponding to conversation sessions at instances of the interactive conversation service; and generate the set of response vectors using the at least one word embedding function trained on the corpus of conversation data corresponding to conversation sessions at instances of the interactive conversation service.

17. The apparatus of claim 15, wherein the selected response is recommended to an agent for responding to the input.

18. The apparatus of claim 15, wherein the instructions are further executable by the processor to cause the apparatus to:
display the selected response at a user interface of a user device corresponding to the user for recommendation of the selected response.

19. An apparatus comprising:
a processor,
memory in electronic communication with the processor; and
instructions stored in the memory and executable by the processor to cause the apparatus to:
generate training data based on a corpus of conversation data including sequences of inputs corresponding to conversation sessions at the interactive conversation service, the training data including a set of context-response pairs and a label corresponding to each of the set of context-response pairs, a context of a context-response pair including a sequence of inputs during a conversation session, and a response being a subsequent input by an agent during the conversation session, the training data generated by:
for a first conversation session in the corpus of conversation data, selecting a first set of sequential inputs of the first conversation session as a first context of a first context-response pair, selecting an input by an agent that is immediately subsequent to the first set of sequential inputs as a first response of the first context-response pair, and assigning a first value to a first label corresponding to the first context-response pair; and
for a second conversation session in the corpus of conversation data, selecting a second set of sequential inputs of the second conversation session as a second context of a second context-response pair, selecting a random input of the corpus conversation data as a second response of the second context-response pair, and assigning a second value to a second label corresponding to the second context-response pair;
train at least one word embedding function by:
generating a context vector for each context of each context-response pair of the set of context-response pairs using a context word embedding function of the at least one word embedding function;
generating a response vector for each response of each context-response pair of the set of context-response pairs using a response word embedding function of the at least one word embedding function;
calculating a similarity score for each context-response pair of the set of context-response pairs by comparing the context vector and the response vector of each context-response pair; and determining a loss for each context-response pair of the set of context-response pairs based at least on the similarity score and the label corresponding to each context-response pair of the set of context-response pairs.

20. The apparatus of claim 19, wherein the first set of sequential inputs and the second set of sequential inputs comprise a same number of inputs.

* * * * *